(12) United States Patent
Tsai

(10) Patent No.: US 11,349,190 B2
(45) Date of Patent: May 31, 2022

(54) FLEXIBLE PLATE-BASED RADAR ANTENNA DEVICE WITH FIELD OF VIEW OVER 160 DEGREES

(71) Applicant: ROYALTEK COMPANY LTD., Taoyuan (TW)

(72) Inventor: Ming-Hung Tsai, Taoyuan (TW)

(73) Assignee: Royaltek Company Ltd., Taoyuan (TW)

(\*) Notice: Subject to any disclaimer, the term of this patent is extended or adjusted under 35 U.S.C. 154(b) by 11 days.

(21) Appl. No.: 17/106,813

(22) Filed: Nov. 30, 2020

(65) Prior Publication Data
US 2022/0123454 A1    Apr. 21, 2022

(30) Foreign Application Priority Data
Oct. 20, 2020  (TW) .................... 109136261

(51) Int. Cl.
*H01Q 1/08* (2006.01)
*G01S 7/03* (2006.01)
(Continued)

(52) U.S. Cl.
CPC ............. *H01Q 1/085* (2013.01); *G01S 7/032* (2013.01); *G01S 13/931* (2013.01);
(Continued)

(58) Field of Classification Search
CPC ........ H01Q 1/085; H01Q 1/32; H01Q 1/3208; H01Q 1/3233; H01Q 1/36; G01S 7/032; G01S 13/93; G01S 13/931
See application file for complete search history.

(56) References Cited

U.S. PATENT DOCUMENTS

| 10,794,995 B2 | 10/2020 | Park |
| 2019/0064364 A1* | 2/2019 | Boysel ................. G05D 1/0231 |

(Continued)

FOREIGN PATENT DOCUMENTS

| TW | 201441645 A | 11/2014 |
| TW | 202030498 A | 8/2020 |

OTHER PUBLICATIONS

Communication From the Taiwan Patent Office Regarding a Corresponding Foreign Application Dated (Taiwan Year 110) dated Jun. 7, 2021.

*Primary Examiner* — Jason Crawford
(74) *Attorney, Agent, or Firm* — Rosenberg, Klein & Lee

(57) ABSTRACT

A flexible plate-based radar antenna device with a field of view over 160 degrees comprises a support base, two antenna boards, and a circuit board. The support base has an installation surface and two inclined surfaces. Two antenna boards are flexible plates, and their back surfaces are respectively stuck onto two inclined surfaces of the support base. Several set of antennas are disposed on front surface of the antenna boards for transmitting detection signals and receiving reflection signals from at least one obstacle. The circuit board is electrically connected with two antenna boards, controlling the antenna boards to transmit and receive signals. As long as the shape of the support base is adjusted to make the antenna boards able to stick onto it, the antenna boards of the present invention are applicable to radar devices having an arbitrary shape. Therefore, the present invention can simplify the fabrication process.

7 Claims, 5 Drawing Sheets

(51) Int. Cl.
*H01Q 1/32* (2006.01)
*H01Q 1/36* (2006.01)
*G01S 13/931* (2020.01)
*H01Q 9/04* (2006.01)

(52) U.S. Cl.
CPC ............ *H01Q 1/3233* (2013.01); *H01Q 1/36* (2013.01); *H01Q 9/0407* (2013.01)

(56) References Cited

U.S. PATENT DOCUMENTS

2020/0176876 A1\* 6/2020 Pance ...................... H01Q 5/50
2020/0249343 A1\* 8/2020 Yu ........................ G01S 13/584
2020/0355814 A1\* 11/2020 Tsai ....................... H01Q 19/17
2021/0063557 A1\* 3/2021 Yu ........................ H01Q 1/3283

\* cited by examiner

FLEXIBLE PLATE-BASED RADAR ANTENNA DEVICE WITH FIELD OF VIEW OVER 160 DEGREES

This application claims priority of Application No. 109136261 filed in Taiwan on 20 Oct. 2020 under 35 U.S.C. § 119; the entire contents of all of which are hereby incorporated by reference.

BACKGROUND OF THE INVENTION

Field of the Invention

The present invention relates to a vehicular radar technology, particularly to a flexible plate-based radar antenna device with a field of view over 160 degrees.

Description of the Prior Art

Vehicular radar technologies are developed to assist drivers in detecting blind spots and promote driving safety, including Packing Assist Systems (PAS), Blind Spot Detection (BSD) systems, Lane change Alert (LCA) systems, and Door Open Warning (DOW) systems. Different vehicular assist systems respectively have different alarm distances. Once the distance between an obstacle and the vehicle is shorter than or equal to the alarm distance, the radar system would generate an alarm signal to warn the driver.

The conventional vehicular radar technologies are used by the vehicular assist systems, such as Packing Assist Systems (PAS), Blind Spot Detection (BSD) systems, Lane change Alert (LCA) systems, and Door Open Warning (DOW) systems. However, the conventional radar technology adopt two independent radar systems, which are respectively installed on two sides of the vehicular bumper. Two radar systems respectively transmit detection signals and receive the reflected detection signals. The detection results are sent to an in-vehicle system. The in-vehicle system calculates the distance between the obstacle and the vehicle and determines whether to send out an alarm signal. Therefore, the dedicated software of the vehicular assist system must be installed in the in-vehicle system. Once the in-vehicle system malfunctions or crashes, the vehicular assist system will fail to work. Thus, the driving safety is affected.

Accordingly, the present invention proposes a flexible plate-based radar antenna device with a field of view over 160 degrees, wherein the motherboard is disposed in the radar antenna device; the antenna board is divided into two antenna boards respectively facing different directions, whereby the shape of the radar device can be designed more flexibly and the abovementioned problems can be solved more effectively. The principles and embodiments of the present invention will be described in detail below.

SUMMARY OF THE INVENTION

The primary objective of the present invention is to provide a flexible plate-based radar antenna device with a field of view over 160 degrees, wherein the antenna board of the radar is a flexible plate that is soft and can be stuck to a structure of an arbitrary shape compliantly, whereby the design of the shape of a radar device becomes more flexible.

Another objective of the present invention is to provide a flexible plate-based radar antenna device with a field of view over 160 degrees, wherein two antenna boards are disposed in a radar antenna device and respectively faced to different directions, whereby a single radar can have a field of view over 160 degrees.

In order to achieve the abovementioned objectives, the present invention proposes a flexible plate-based radar antenna device with a field of view over 160 degrees, which comprises a support base, two antenna boards, and a circuit board. The support base has an installation surface and two inclined surfaces. The angle between the installation surface and each of the inclined surfaces is assigned as a first angle. The angle between the upward extensions of two inclined surfaces is assigned as a second angle. Two antenna boards are flexible plates. The back surfaces of two antenna boards are respectively stuck onto two inclined surfaces of the support base. At least one set of transmitting antennas and at least one set of receiving antennas are disposed on the front surface of the antenna board, respectively transmitting detection signals and receiving reflection signals from at least one obstacle. The circuit board is electrically connected with connection ends of two antenna boards, controlling the antenna boards to transmit the detection signals and receive the reflection signals.

In one embodiment, the set of transmitting antennas and the set of receiving antennas are patch antenna.

In one embodiment, the second angle ranges between 30 and 50 degrees.

In one embodiment, two antenna boards are bent upward from the connection ends and then bent outward to make the set of transmitting antennas and the set of receiving antennas face upward obliquely and face outward.

In one embodiment, the present invention further comprises a bottom base and a top cover. The circuit board is disposed on the bottom base. The top cover and the bottom base are joined to form an integral body.

In one embodiment, the antenna board is a thin printed circuit board assembled to the circuit board; the installation surface of the support base is connected with the circuit board.

In one embodiment, the circuit board is a printed circuit board; the antenna boards are flexible printed circuit boards; patch antenna are disposed on the antenna boards to function as the set of transmitting antennas and the set of receiving antennas; the circuit board and the antenna boards are fabricated into an integral structure.

In one embodiment, the antenna boards are disposed at two adjacent edges of the circuit board; the installation surface of the support base is connected with the bottom base.

DETAILED DESCRIPTION OF THE INVENTION

The present invention provides a flexible plate-based radar antenna device with a field of view over 160 degrees, which is applicable to vehicular radars, wherein flexible antenna boards that can be compliantly stuck to a support frame with an arbitrary shape are used in the radar, whereby the present invention is adapted to radar devices of various shapes.

Figure 1:
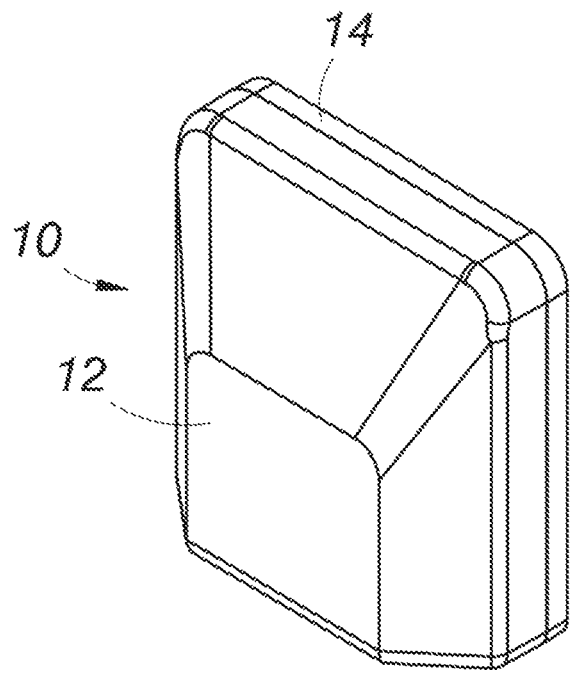
FIG. 1 is a perspective view of a flexible plate-based radar antenna device with a field of view over 160 degrees according to one embodiment of the present invention.
Figure 2:
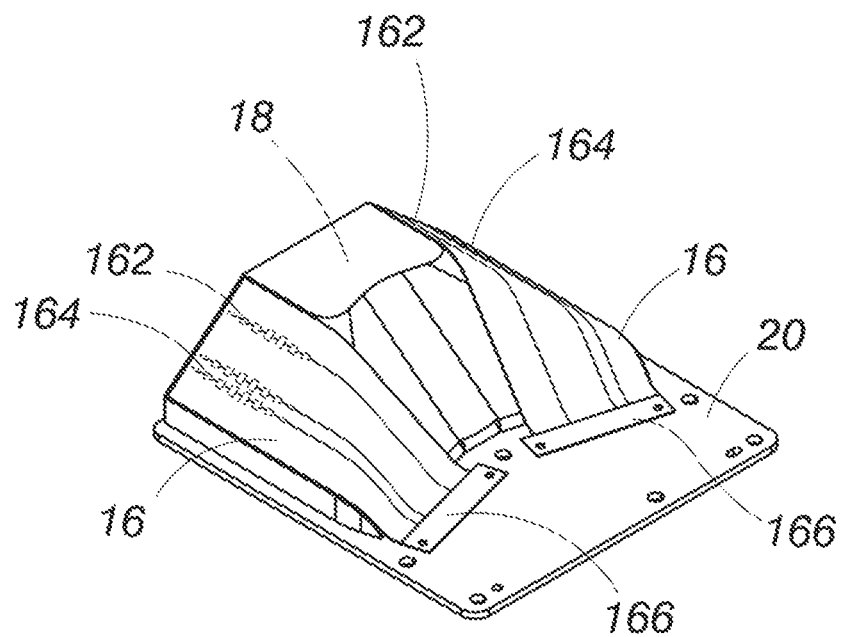
FIG. 2 is a perspective view of a flexible plate-based radar antenna device with a field of view over 160 degrees according to one embodiment of the present invention, wherein the top cover is removed.
Figure 3:
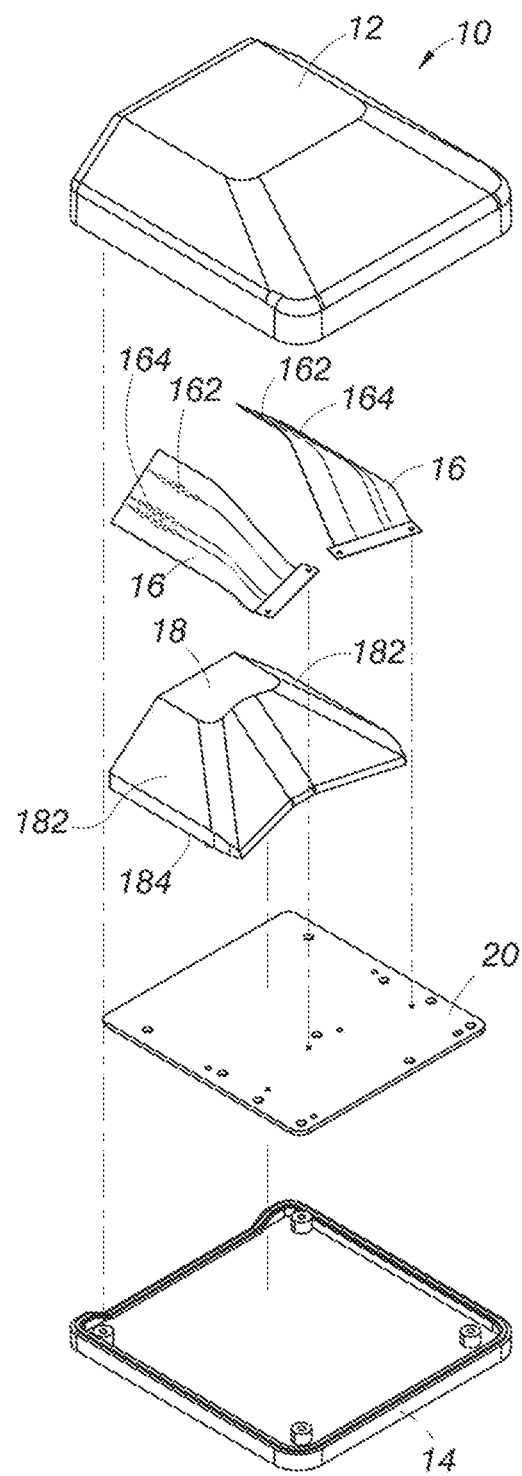
FIG. 3 is an exploded view of a flexible plate-based radar antenna device with a field of view over 160 degrees according to one embodiment of the present invention.

Refer to FIGS. 1-3. FIG. 1 is a perspective view of a flexible plate-based radar antenna device 10 with a field of view over 160 degrees according to one embodiment of the present invention. FIG. 2 is a perspective view of the flexible plate-based radar antenna device 10 with a field of view over 160 degrees, whose top cover is removed. FIG. 3 is an exploded view of the flexible plate-based radar antenna device 10 with a field of view over 160 degrees.

The flexible plate-based radar antenna device 10 with a field of view over 160 degrees of the present invention comprises a top cover 12, a bottom base 14, two antenna boards 16, a support base 18 and a circuit board 20. The top cover 12 may be assembled to the bottom base 14. The support base 18 includes two inclined surfaces 182 and an installation surface 184. The angle between the installation surface 184 and each of two inclined surfaces 182 is assigned as a first angle. The angle between the upward extensions of two inclined surfaces 182 is assigned as a second angle. Two inclined surfaces 182 may be in a symmetric relation or an asymmetric relation. The antenna boards 16 are flexible plates featuring softness and compliance. The back surfaces of two antenna boards 16 are respectively stuck onto two inclined surfaces 182 of the support base 18. One end of the antenna board 16 is a connection end 166. The connection end 166 of each antenna board 16 is electrically connected with the circuit board 20. In the embodiment shown in FIG. 2 and FIG. 3, the antenna boards 16 are assembled to the circuit board 20 with fastening elements. At least one set of transmitting antennas 162 and at least one set of receiving antennas 164 are disposed on the front surface of each antenna board 16, respectively transmitting detection signals and receiving reflection signals from at least one obstacle. The other end of the antenna board 16, which is opposite to the connection end 166, is tilted outward by an angle. Therefore, the set of transmitting antennas 162 and the set of receiving antennas 164 can respectively transmit detection signals outward and receive reflection signals reflected by the obstacles in a wide angle. The circuit board 20 is a printed circuit board installed on the bottom base 14 and disposed on the same horizontal plane as the installation surface 184 of the support base 18. The circuit board 20 controls the antenna boards 16 to transmit detection signals and receive reflection signals. Then, the circuit board 20 undertakes computations, such as calculating the distance from the vehicular body to an obstacle and calculating the angle between the vehicle body and the road surface. The installation surface 184 of the support base 18 is joined with the circuit board 20. The inclined surfaces 182 of the support base 18 are joined with the antenna boards 16. The flexible antenna boards 16 are compliantly stuck onto the upper surface of the support base 18, as shown in FIG. 2.

Figure 4A:
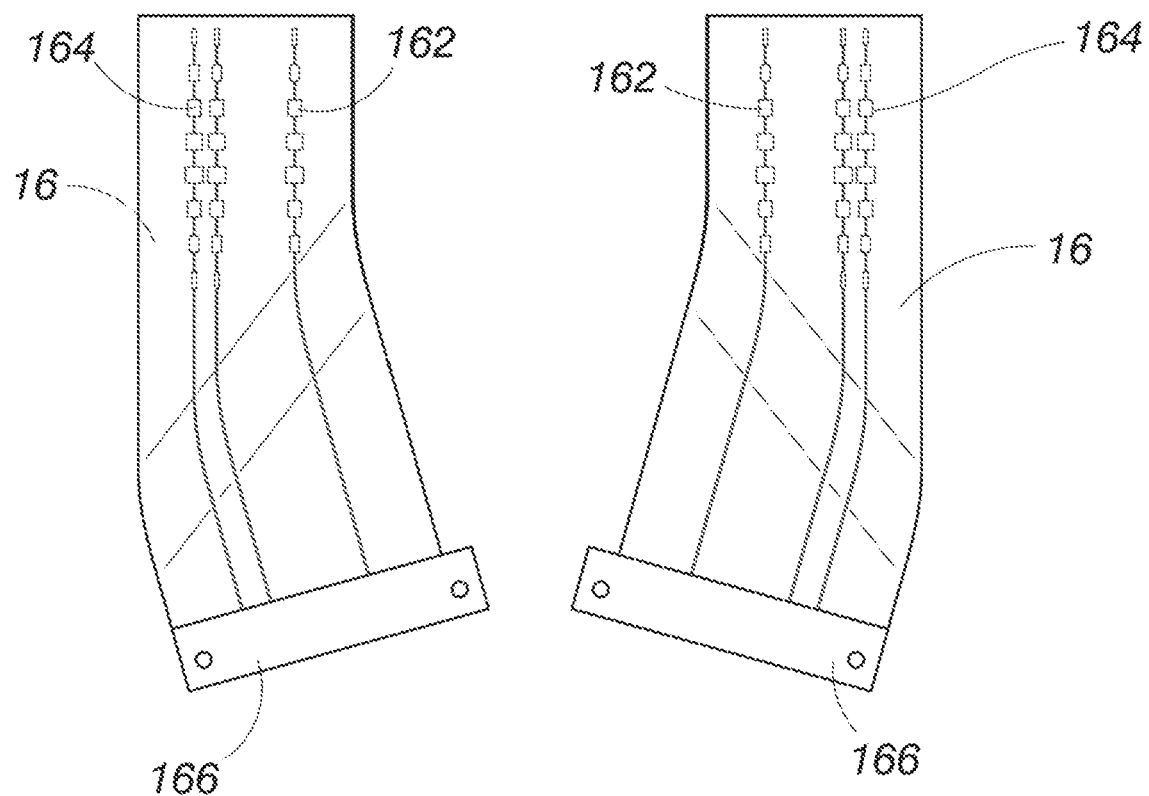
FIG. 4A is a top view of antenna boards according to one embodiment of the present invention.

In the present invention, the set of transmitting antennas 162 and the set of receiving antennas 164 are patch antennas. In one embodiment, the antenna boards 16 is bent upward from the connection end 166 and then bent outward from the central region to make the set of transmitting antennas 162 and the set of receiving antennas 164 face the above obliquely. However, the present invention is not limited by this embodiment. The shape of the antenna boards 16 is dependent on the shape of the support base 18. It should be noted: the chips of the set of transmitting antennas 162 and the set of receiving antennas 164 are not disposed on the bent area but only installed on the final planar segment. Refer to FIG. 4A. FIG. 4A is a top view of the antenna boards. It can be seen in FIG. 4: what is bent is the transmission lines of the set of transmitting antennas 162 and the set of receiving antennas 164. Therefore, the functions of the antenna are not affected.

In the embodiment shown in FIG. 2 and FIG. 3, the antenna board 16 is a thin printed circuit board having a thickness of about 0.2 mm. Although the printed circuit board is made of a rigid material, the thinness thereof is sufficient to make it bendable. However, the rigid printed circuit board is likely to be damaged. In another embodiment, the antenna board 16 may be made of a liquid-crystal polymer (LCP) featuring bendability and toughness. However, the cost thereof is higher.

In the present invention, the circuit board 20 sends detection signals for detecting whether there is an obstacle to the radiating antenna (not shown in the drawings) on the back side of the antenna boards 16. Next, the detection signals are sent to the coupling point (not shown in the drawings), which is on the front side of the antenna boards 16 and exactly opposite to the radiating antenna, through a signal coupling method. Next, the signal coupling point sends the detection signals to the set of transmitting antennas 162, and the set of transmitting antennas 162 sends out the detection signals. While the detection signals hit an obstacle and are reflected by the obstacle, the reflection signals are received by the receiving antenna 164. The reflection signals are sent to the signal coupling point and next coupled to the radiating antenna, which is on the back side of the antenna boards 16. Then, the reflection signals are further sent to the circuit board 20. The circuit board 20 is a motherboard where a microprocessor (not shown in the drawings) is disposed to undertake computation. Therefore, the vehicular assist systems, such as the Packing Assist System (PAS), the Blind Spot Detection (BSD) system and the Lane change Alert (LCA), needn't be installed in an in-vehicle system but may be installed in the circuit board 20.

Figure 4B:
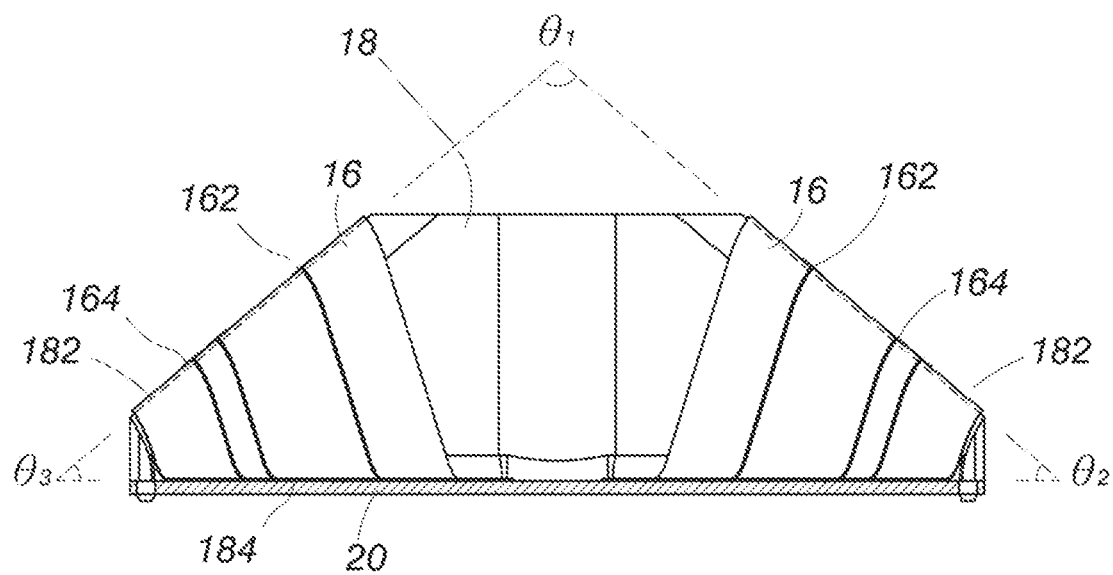
FIG. 4B is a front view of a flexible plate-based radar antenna device with a field of view over 160 degrees according to one embodiment of the present invention.

Refer to FIG. 4B. FIG. 4B is a front view of a flexible plate-based radar antenna device with a field of view over 160 degrees according to one embodiment of the present invention. In FIG. 4B, an angle θ1 between the upward extensions of two inclined surfaces 182 is assigned as a second angle; an angle θ2 or θ3 between the installation surface 182 and the inclined surface 184 is assigned as a first angle. If two inclined surfaces 182 are symmetric, the angle θ2 is equal to the angle θ3. As the antenna boards 16 are compliantly stuck onto the support base 18, the angles θ2 and θ3 may be regarded as the inclinations of the rear half parts of the antenna boards 16. In one embodiment, the second angle θ1 ranges from 30 to 50 degrees, whereby the antenna boards 16 has a field of view greater than 160 degrees for detecting obstacles.

Figure 5:
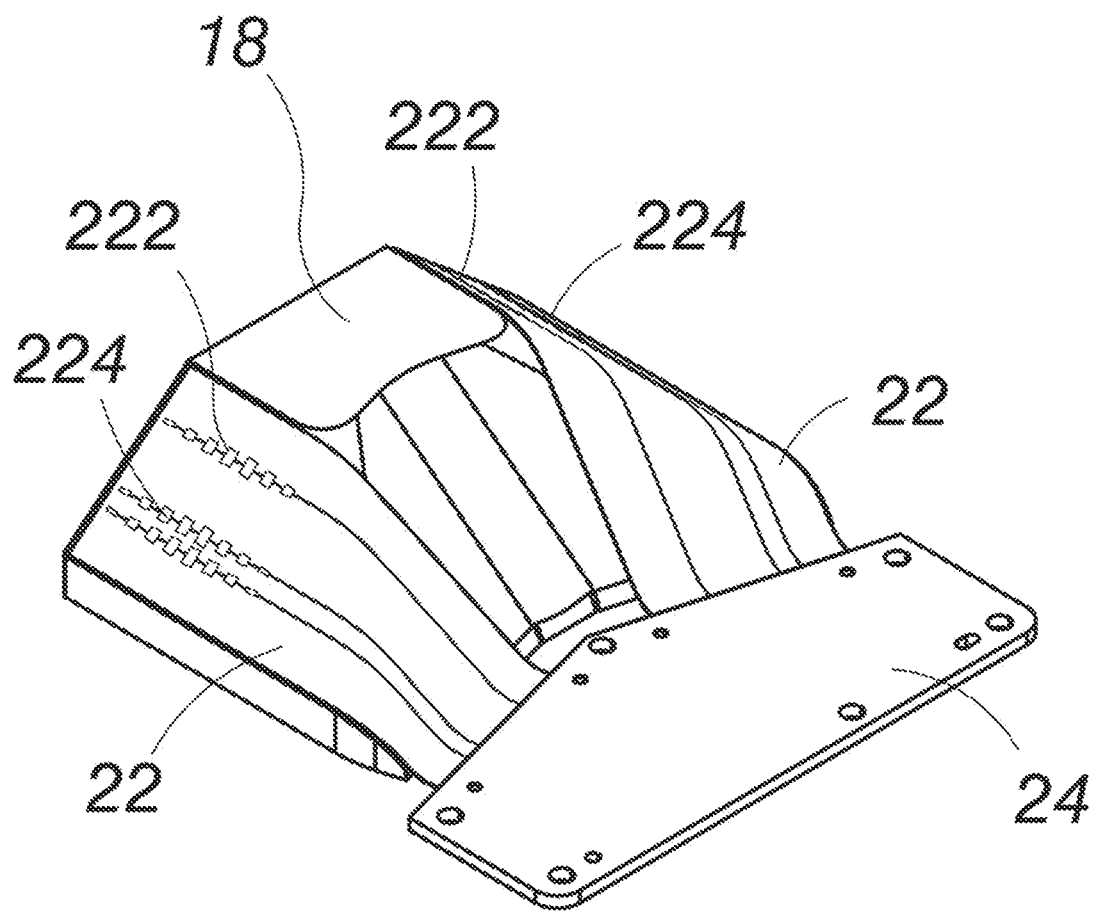
FIG. 5 is a perspective view of a flexible plate-based radar antenna device with a field of view over 160 degrees according to another embodiment of the present invention.
Figure 6:
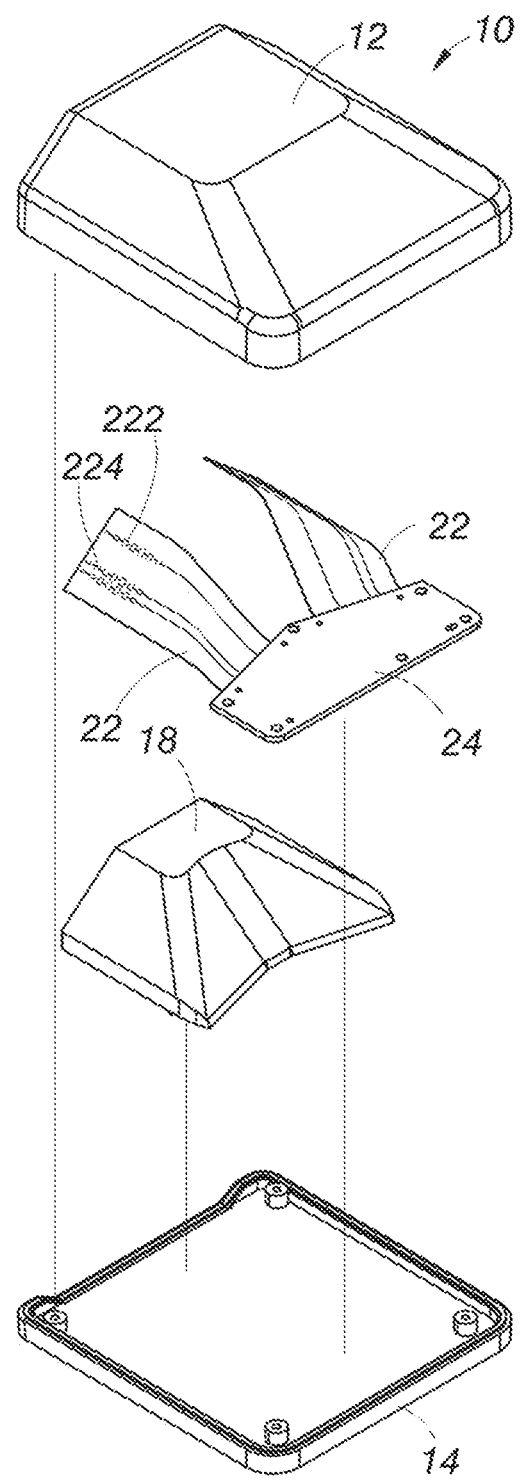
FIG. 6 is an exploded view of a flexible plate-based radar antenna device with a field of view over 160 degrees according to another embodiment of the present invention.

FIG. 5 and FIG. 6 schematically show a flexible plate-based radar antenna device with a field of view over 160 degrees according to another embodiment of the present invention, wherein FIG. 5 is a perspective view of the present invention with a top cover being removed; FIG. 6 is an exploded view of the present invention.

In the embodiment shown in FIG. 5 and FIG. 6, the circuit board 24 is a polygon and smaller than the circuit board 20 in the abovementioned embodiment. Two antenna boards 22 are respectively disposed at two adjacent edges of the circuit board 24. As the circuit board 24 is smaller, the support base 18 is not disposed on the circuit board 24 but disposed on the bottom base 14. The primary difference between the embodiment of FIG. 5 and FIG. 6 and the embodiment of FIG. 2 and FIG. 3 is that the antenna boards 22 and the circuit board 24 are fabricated into an integral structure. The antenna boards 22 are flexible printed circuit boards, which is soft and stuck onto the support base 18. Patch antenna are stuck onto the antenna boards 22 to function as the set of transmitting antennas 222 and the set of receiving antennas 224. The circuit board 24 is a printed circuit board. The current technology has been able to join a printed circuit board and a flexible printed circuit board together adhesively to form an integral body. Application of the technology can fabricate the antenna board 22 and the circuit board 24 into an integral structure.

In conclusion, the present invention provides a flexible plate-based radar antenna device with a field of view over 160 degrees, which comprises two antenna boards respectively facing different directions, whereby to expand the viewing angle. As long as the radar antenna device is installed in the front portion or the rear portion of a vehicle, it is sufficient to detect the obstacles on the left side and the right side of the vehicle. The present invention uses a flexible material to fabricate the antenna boards, whereby the present invention is adapted to various specifications of radars. No matter what shape a radar has, the present invention exempts the manufacturers from fabricating a new mold for the antenna boards. The antenna boards of the present invention can be directly stuck onto the interior structure (such as the support structure), wherefore the present invention can simplify the fabrication process and save the fabrication cost. Besides, the present invention does not dispose the motherboard in an in-vehicle system but disposes the motherboard inside the radar antenna device. Once the motherboard is damaged, the user can directly replace the radar device, exempted from replacing the entire in-vehicle system.

The embodiments have been described above to demonstrate the present invention. However, these embodiments are only to exemplify the present invention but not to limit the scope of the present invention. Any equivalent modification or variation according to the characteristics or spirit of the present invention is to be also included by the scope of the present invention.

What is claimed is:

1. A flexible plate-based radar antenna device with a field of view over 160 degrees, comprising a support base, including an installation surface and two inclined surfaces, wherein an angle between said installation surface and one of said two inclined surfaces is assigned as a first angle; an angle between upward extensions of said two inclined surfaces is assigned as a second angle;

two antenna boards, being flexible plates, wherein back surfaces of said two antenna boards are completely respectively stuck onto said two inclined surfaces of said support base; at least one set of transmitting antennas and at least one set of receiving antennas are disposed on a front surface of each of said two antenna boards to respectively transmit detection signals and receive refection signals from at least one obstacle; and a circuit board, electrically connected with connection ends of said two antenna boards, on the same horizontal plane as said installation surface of said support base, for controlling said two antenna boards to transmit said detection signals and receive said reflection signals;

wherein the circuit board separates from the antenna boards by the support base;

wherein said two antenna boards are bent upward from said connection ends and then bent outward to make said set of transmitting antennas and said receiving antennas face upward obliquely and face outward.

2. The flexible plate-based radar antenna device with a field of view over 160 degrees according to claim 1, wherein said set of transmitting antennas and said set of receiving antennas are patch antenna.

3. The flexible plate-based radar antenna device with a field of view over 160 degrees according to claim 1, wherein said second angle ranges from 30 to 50 degrees.

4. The flexible plate-based radar antenna device with a field of view over 160 degrees according to claim 1 further comprising a bottom base and a top cover, wherein said circuit board is disposed on said bottom base; said top cover and said bottom base are assembled together.

5. The flexible plate-based radar antenna device with a field of view over 160 degrees according to claim 4, wherein said circuit board is a printed circuit board; said antenna board is a flexible printed circuit board; patch antennas are disposed on said antenna board to function as said set of transmitting antennas and said set of receiving antennas; said circuit board and said antenna boards are fabricated to an integral structure.

6. The flexible plate-based radar antenna device with a field of view over 160 degrees according to claim 5, wherein said antenna boards are disposed at two adjacent edges of said circuit board; said installation surface of said support base is connected with said bottom base.

7. The flexible plate-based radar antenna device with a field of view over 160 degrees according to claim 1, wherein said antenna board is a thin printed circuit board assembled to said circuit board; said installation surface of said support base is connected with said circuit board.

* * * * *